United States Patent [19]

Yadegar

[11] Patent Number: 5,528,946
[45] Date of Patent: Jun. 25, 1996

[54] APPARATUS FOR CONVERSION OF RECIPROCATING MOTION TO ROTARY MOTION AND VISE VERSA

[76] Inventor: Iraj Yadegar, P.O. Box 1635, Studio City, Calif. 91604

[21] Appl. No.: 239,206

[22] Filed: May 6, 1994

[51] Int. Cl.[6] .................................................. F16H 19/04
[52] U.S. Cl. .................. 74/31; 74/32; 92/136; 123/55.7; 123/197.1
[58] Field of Search ......................... 74/29, 30, 31, 74/32; 123/55.5, 55.7, 197.1; 92/136

[56] References Cited

U.S. PATENT DOCUMENTS

| | | | |
|---|---|---|---|
| 91,555 | 6/1869 | Mitchell | 74/32 |
| 370,709 | 9/1887 | Mathias et al. | 74/32 |
| 719,595 | 2/1903 | Huss | 74/29 X |
| 1,105,418 | 7/1914 | Gift | 74/32 |
| 1,399,666 | 12/1921 | Short | 74/32 X |
| 1,636,612 | 7/1927 | Noah | 74/32 |
| 1,841,021 | 1/1932 | Everts | 74/32 |

*Primary Examiner*—Allan D. Hermann

[57] ABSTRACT

A motion conversion system by which near 100% of a reciprocating motion, and a rotary motion, fluently converted from one to the other includes, a drive shaft (20), an intermediate circular element (22), externally teethed to near one-half of its circumference and an elongated element (24), having a pair of opposed internal teeth and internal curves, forming an elongated hollow to accommodate and constantly engage with the circular element. Due to their geometry and geometrical relationship, the three elements (20), (22) and (24), throughout the full cycle of reciprocating motion of the elongate element (24) and rotary motion of the drive shaft (20), remain fully engaged without interruption and with no further requirement for any additional gear engagement support. Simplicity, versatility, efficiency and easy to implement characteristics of the present invention, makes it the most practical arid effective motion conversion system of its kind. An ideal system that is fully applicable to most all cycle-operating parameters, including single or dual-pistons internal combustion engines, pumps and compressors, cycle-operating exercise equipment as in bicycles and virtually all instruments in which conversion of a reciprocating motion and a rotary motion, from one to the other, is required.

15 Claims, 7 Drawing Sheets

APPARATUS FOR CONVERSION OF RECIPROCATING MOTION TO ROTARY MOTION AND VISE VERSA

BACKGROUND ART

Conversion of reciprocating motion to rotary motion and vice versa, in cycle-operating parameters, particularly, reciprocating internal combustion engines, has been known for many years and numerous arrangements for conversion of reciprocating motion of a piston, to rotary motion of a crankshaft has been proposed. Besides the conventional arrangements that include pistons, connecting-rods and crankshafts, further, it has been proposed in several ways, to utilize an internally or externally teethed roller-gear, attached to a single or dual-headed pistons, to be engaged with a circular-gear, externally teethed and fixedly mounted on a drive shaft.

What distinguishes one such proposal from the other and consider the key to every such invention, chiefly is the system with which a roller-gear and a circular-gear are constantly engaged. Matters to be considered in such gear engagement systems include:

a. consistency between the moving parts from the engineering points of view;

b. efficiency in conversion of maximum energy;

c. fluency in motions, particularly as the circular-gear shifts from one side of the roller gear to the other; and d. simplicity.

Engagement of a roller-gear and a circular-gear in the prior art, typically proposed to be assisted by a secondary gear engagement system, designed specifically to maintain constant engagement of the roller-gear and the circular-gear. Such gear engagement systems in general, either having complex embodiment involving numerous moving parts, or not properly functional, due to inconsistency between the moving parts and poor engineering design. Lack of said major requirements, perhaps is the reason as to way such proposals are yet to be accepted as a superior alternative to the conventional crankshaft and connecting-rod systems. Examples of such arrangements, are shown in U.S. Pat. Nos. 1,316,437 to Flood, 4,395,977 to Pahis, 4,608,951 to White, 4,864,976 to Falero and 4,941,396 to McCabe.

SUMMARY OF THE INVENTION

As its principal objects, the present invention is to provide an arrangement with which a continuous reciprocating motion and rotary motion, fluently converted from one to the other. A simple, practical, versatile, efficient, and easy to implement mechanism that enjoys significant engineering value and operates without the assistance of a secondary gear engagement system. An arrangement adaptable by most all cycle-operating parameters including but not limited to:

a. single or dual-piston reciprocating internal combustion engines, b. pumps and compressors, c. pedals driven modules as in bicycles, d. cycles-operated fitness equipment, e. robotics, and virtually all means in which conversion of a reciprocating motions and rotary motions from one to the other, are required.

As its principal embodiments, the present invention comprises following three members:

1. A drive-shaft

2. An intermediate circular element

3. An elongated element

Due to their unique geometry, said three members were maintained constantly engaged, with no additional gear engagement support. Such simplicity provides tremendous advantages for internal combustion engines whereby efficiency is significantly improved, compression-ratio is increased and engines run cooler and less pollutant. Consequently, required energies generated in much smaller and lighter engines that in fact, may last longer. Pumps and compressors by utilizing the present invention will be more productive and bicycles, due to the superb energy conversion ratio of the present invention, will run faster.

Reason for such significant improvements, mainly lies in the unparalleled motion conversion system of the present invention. A simple mechanism by which near 100% of a linear energy, fluently converted to a rotary energy and near 100% of a rotary energy, fluently converted to a linear energy, practically with near zero friction.

DETAILED DESCRIPTION OF THE PREFERRED EMBODIMENT

Figures 1, 2:
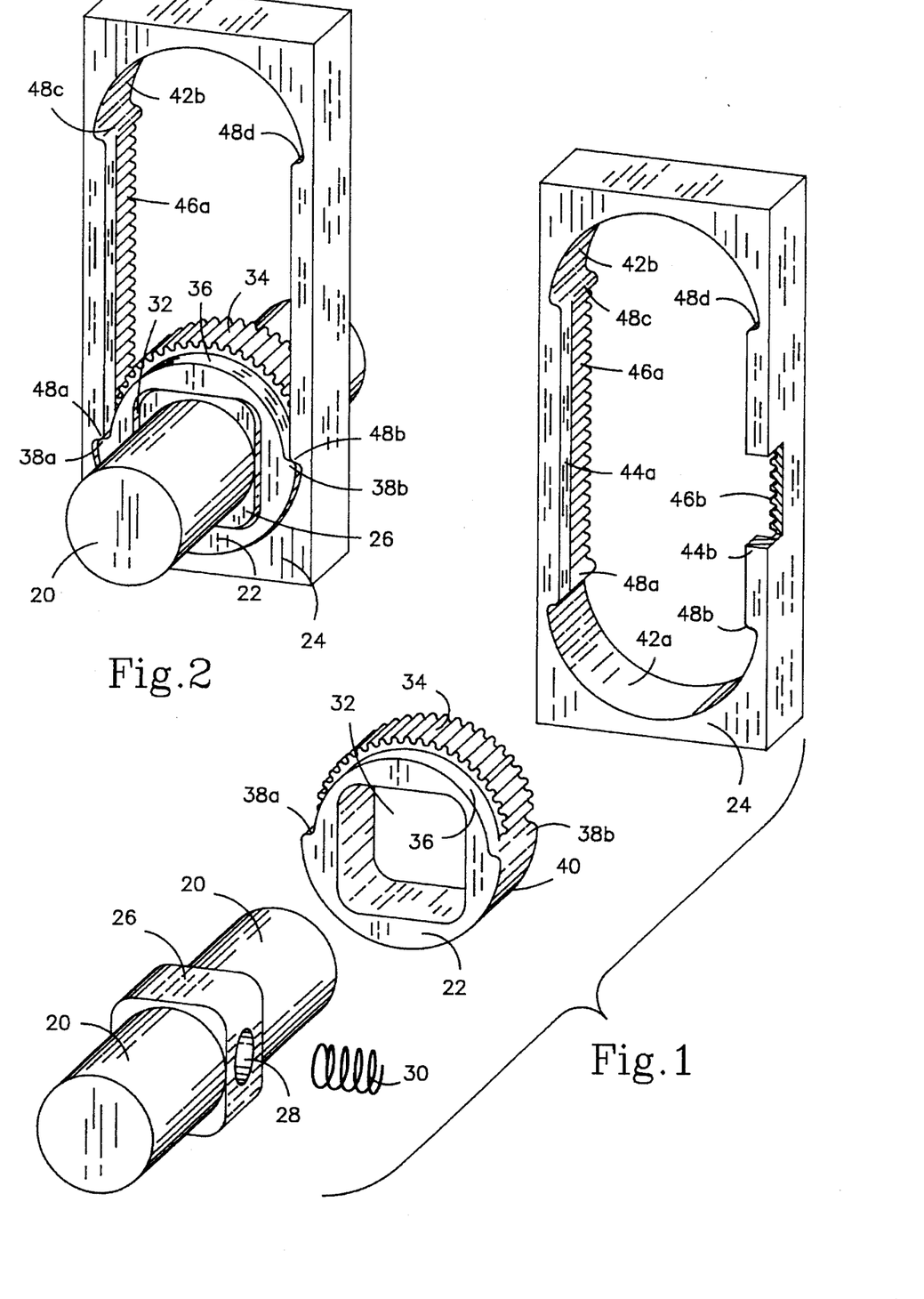
FIG. 1 is an exploded perspective plan view of a drive shaft, an intermediate circular element and an elongated element.
FIG. 2 shows an assembled view of FIG. 1
Figures 3A, 3B, 4A, 4B:
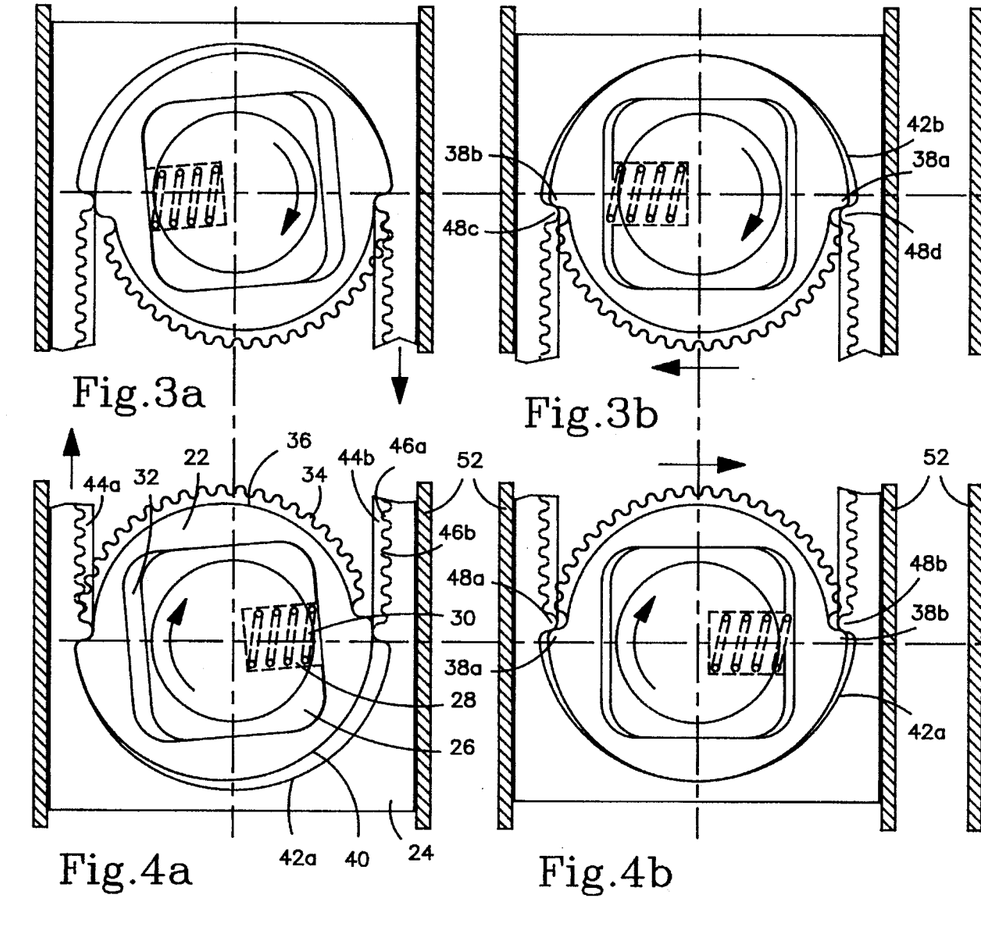
FIGS. 3a, 3b, and 3c show, a gear shifting sequence of a pivoting tooth at the upper end of the elongated element.
FIGS. 4a, 4b, and 4c show, a gear shifting sequence of the pivoting tooth at the lower end of the elongated element.
Figure 3C:
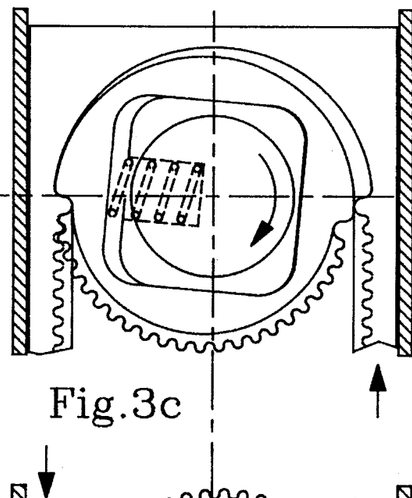
Figure 4C:
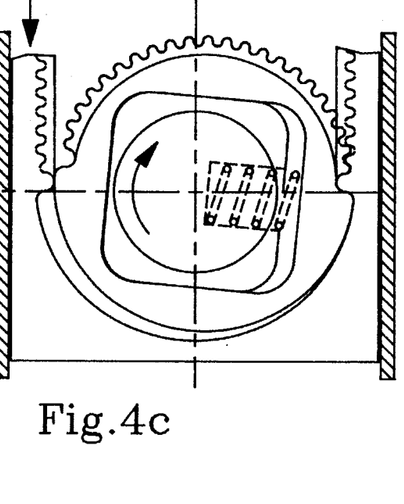

As shown in FIG. 1, a preferred embodiment of the present invention includes a drive shaft 20, an intermediate circular element 22, and an elongated element 24.

The drive shaft 20, is having a sliding block 26 formed thereon and a socket 28 formed thereto. Said socket 28, is to accommodate a spring 30.

The intermediate circular element 22, is externally teethed 34 to near one-half of its circumference and further, having a pair of step teeth 38a and 38b, on both ends of said external teeth 34. Said step teeth 38a and 38b are tangential to the other half of said intermediate circular element 22, and together forming a pivoting tooth 40.

Said intermediate circular element 22, furthermore formed thereto a sliding hole 32 to accommodate said sliding block 26, and formed thereon, an arced rim 36, adjacent and in agreement with said external teeth 34.

The elongated element 24, having a pair of elongated internal teeth 46a and 46b, opposed from of each other and of equal teeth amount. Said teeth amount are as well to agree with the teeth amount of said external teeth 34. Each said elongated internal teeth 46a and 46b, furthermore having a pair of shifting tooth 48a and 48c or 48b and 48d, respectively. The geometry of said shifting teeth 48a, and 48d, are to agree with the geometry of the step tooth 38a, and the geometry of the shifting teeth 48b and 48c, are to agree with the geometry of the step tooth 38b. Said shifting teeth 48a, 48b, and 48c, 48d, are joined by a pair of curved surfaces 42a and 42b respectively, and together forming an elongated hollow.

The elongated element 24, Furthermore includes, a pair of elongated rims 44a and 44b, adjacent and in agreement with said elongated internal teeth 46a and 46b, and tangential to the rising surface of the shifting teeth 48a, 48c and 48b, 48d respectively.

The geometry and geometrical relationship between the three members 20, 22 and 24, are wherewith engagement of said members, in a perfect harmony, constantly maintained.

A preferred geometry and geometrical relationship between the three members 20, 22 and 24, are as follows:

A. The drive shaft 20

Figure 7:
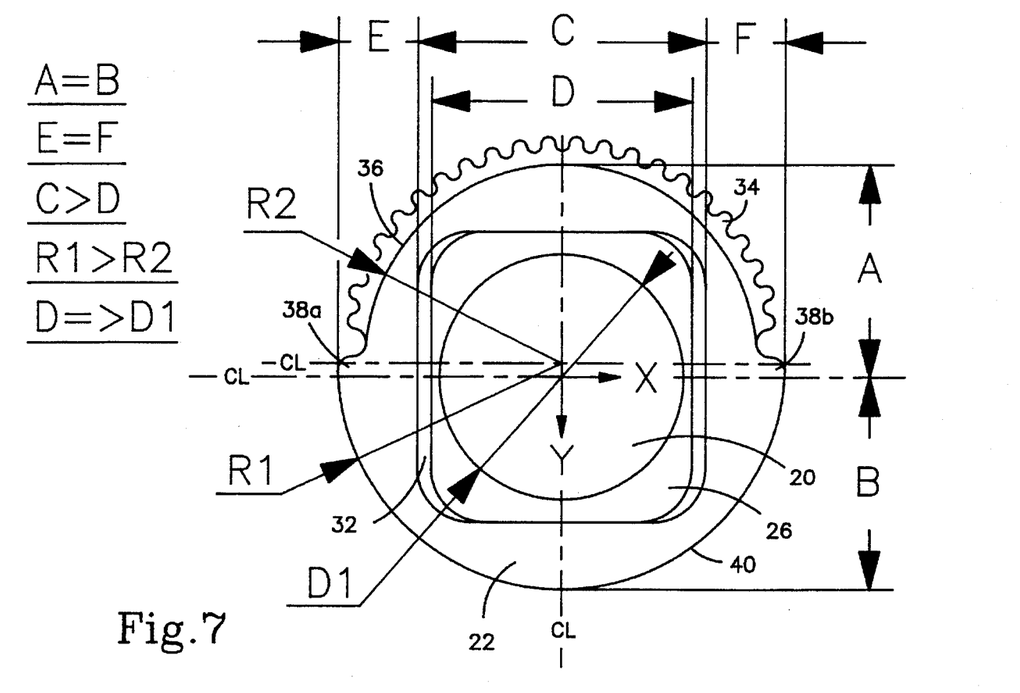
FIG. 7 shows a geometry of an intermediate circular element and its geometrical relationship with a drive shaft sliding block.

As shown in FIG. 7, the sliding block 26, preferably of equal or larger than the drive shaft 20, (D=>D1) and at least two of its horizontal walls paralleled. This is to allow direct fitting of said sliding block 26 within the sliding hole 32.

B. The intermediate circular element 22

As shown in FIG. 7, the sliding hole 32, from its "Y" axis, is tangential to the sliding block 26, and from its "X" axis, is wider than said sliding block 26. (C>D) As shown in FIGS. 3a, 3b, 3c, and 4a, 4b, 4c, said wideness, is to allow sliding of the intermediate circular element 22, merely in the "X" axis, to allow shifting of the pivoting tooth 40, in between the shifting teeth 48a and 48b, or 48c and 48d.

Figure 5A:
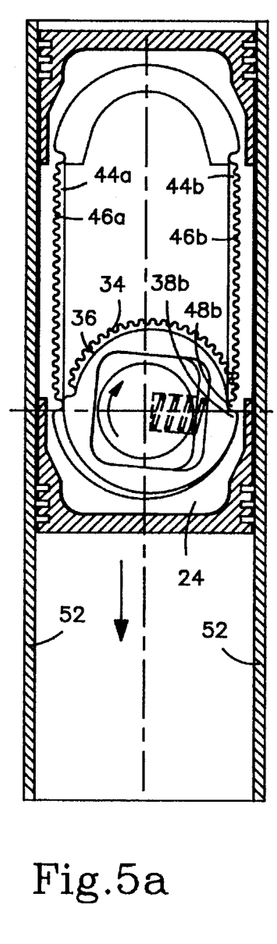
FIGS. 5a, 5b, 5c, 5d, and 5e illustrate a full motion conversion cycle within a cylinder and relationship between the engaging parts.
Figure 5B:
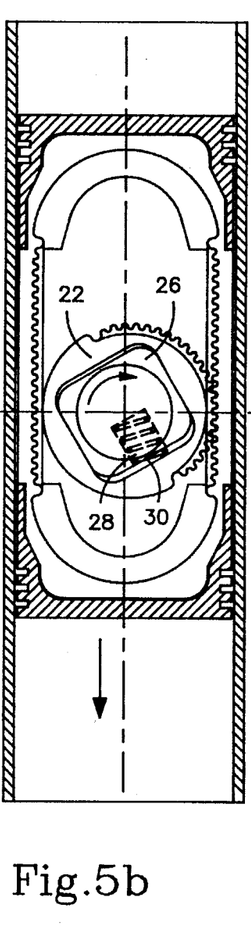
Figure 5C:
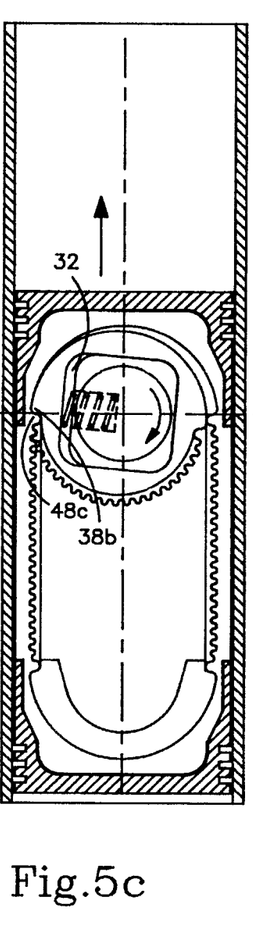
Figure 5D:
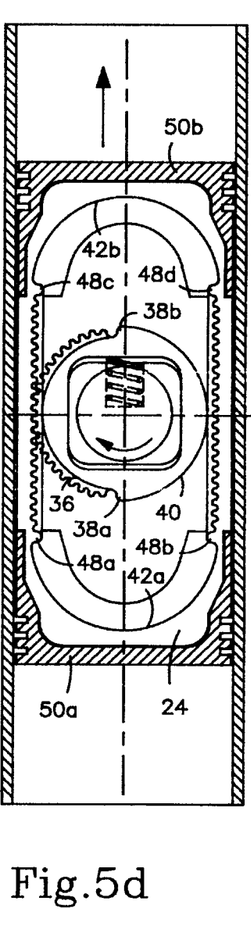
Figure 5E:
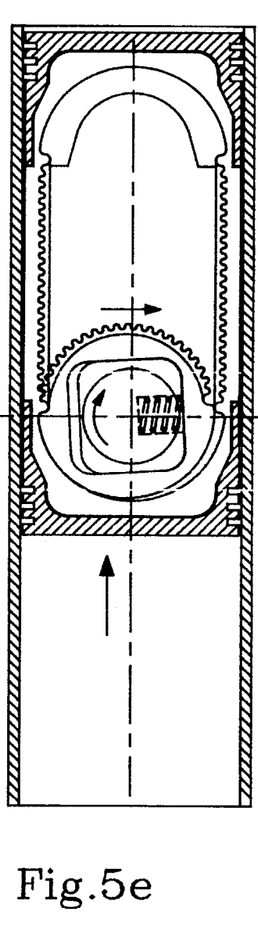

As shown in FIG. 7, distance "A" from the center of the drive shaft 20, to the arced rim 36, is of equal to the distance "B," from said center, to the round surface of the pivoting tooth 40, (A=B) and both sharing the same center, on the positive "Y" axis of the drive shaft 20. As shown in FIG. 5d, said geometrical relationship, is for placement of said circular element 22, precisely at the center of the drive shaft 20, as said intermediate circular element 22, passing the mid section of the elongated element 24.

Distance "E" from the left wall of the sliding hole 32, to the edge of the step tooth 38a, preferably, is of equal to the distance "F" from the right wall of the sliding hole 32, to the edge of the step tooth 38b, for consistency. (E=F)

C. The elongated element 24

As shown in FIGS. 5a, 5b, 5c, 5d and 5e, the elongated internal teeth 46a and 46b, are of equal teeth amount and each agree with the teeth amount of said external teeth 34. The geometry of the shifting teeth 48a, and 48c, or 48b and 48d, are as well agree with the geometry of the step teeth 38a and 38b respectively.

The curved surfaces 42a and 42b, preferably of identical geometry and each consisting of merging segments of eccentric arcs known as NURBS-curve. As shown in FIGS. 3a, 3b, 3c and 4a, 4b, 4c, said NURBS-curves 42a and 42b, are to act as fulcrum means whereby the pivoting tooth 40 as a lever means, via the step tooth 38a, lifts the shifting tooth 48a or 48d, as the step tooth 38b simultaneously, slide to mate with the shifting tooth 48b or 48c.

Figure 6:
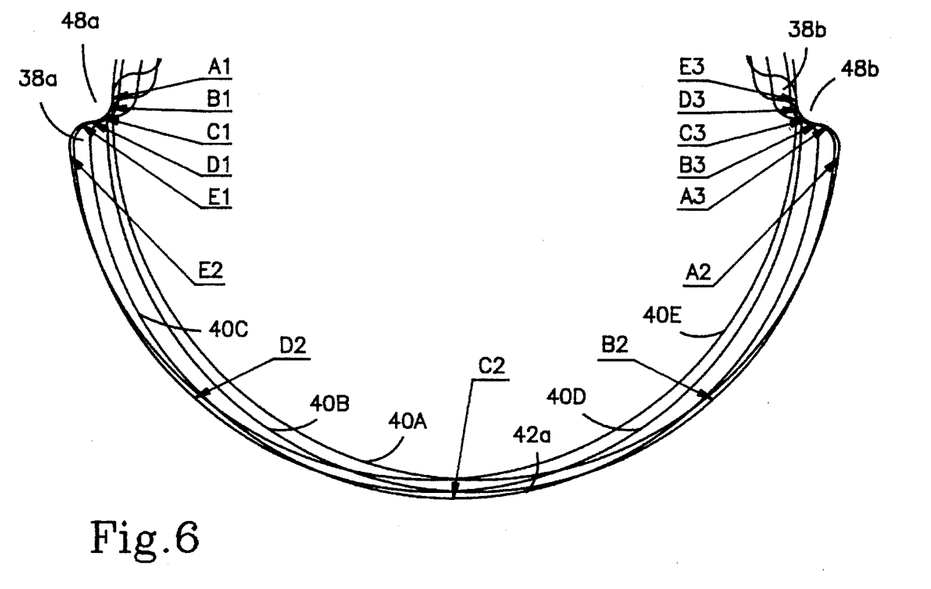
FIG. 6 shows, a geometrical relationship between a NURBS-curve and a pivoting tooth.

As shown in FIG. 6, to obtain said NURBS-curve 42a geometry, three surfaces of the pivoting tooth 40, consisting of, its round surface, the step tooth 38a, and the step tooth 38b, simultaneously, to be tangential to three surfaces of the circular element 24, consisting of, the shifting tooth 48a, the NURBS-curve 42a and the shifting tooth 48b respectively, as said pivoting tooth 40, rotates in between the shifting teeth 48a and 48b. An example of said tangential surfaces, in five consecutive positions, is as follows:

For the pivoting tooth 40, in 40A position, the tangential surfaces are, A1, A2 and A3.

For the pivoting tooth 40, in 40B position, the tangential surfaces are, B1, B2 and B3.

For the pivoting tooth 40, in 40C position, the tangential surfaces are, C1, C2 and C3. In the 40C position, the pivoting tooth 40, is tangential to the mid section of the NURBS-curve 42.

For the pivoting tooth 40, in 40D position, the tangential surfaces are, D1, D2 and D3.

For the pivoting tooth 40, in 40E position, the tangential surfaces are, E1, E2 and E3.

As shown in most all figures, particularly FIGS. 5a, 5b, 5c, 5d and 5e, the spring 30, is to assist the non-rotary motions of the intermediate circular element 22, as in perpendicular motions with respect to the drive shaft 20 axis, within the boundaries of the sliding hole 32 extended "X" axis to constantly urge the sliding hole 32 toward lateral surface of the sliding block 26. The system however, is fully functional without the assistance of said spring 30.

The step teeth 38a and 38b, preferably, are larger than the external teeth 34, and the shifting teeth 48a, 48b, 48c and 48d, preferably, are larger than the elongated internal teeth 46a and 46b. This is to provide a wider surface, wherein the maximum force typically persists. As shown in FIGS. 5a and 5c, in a dual-piston internal combustion engine, wherein the drive shaft 20 rotating clockwise, a power-stroke occurs, as the step tooth 38b and the shifting tooth 48b, or 48c, are fully engaged.

The arced rim 36, in association with the elongated rims 44a and 44b, are to support position of the intermediate circular element 22, precisely at the center of the drive shaft 20, and further to assist constant engagement of the external teeth 34, with the elongated internal teeth 46a or 46b.

The geometries and geometrical relationship between the engaging parts as stated, merely is an example of a preferred embodiment of the present invention. Said geometries and geometrical relationships however, are subject to change as to fit all varieties of cycle-operating parameters wherein convention of a continuous reciprocating motion and a rotary motion from one to the other is required.

Figure 8:
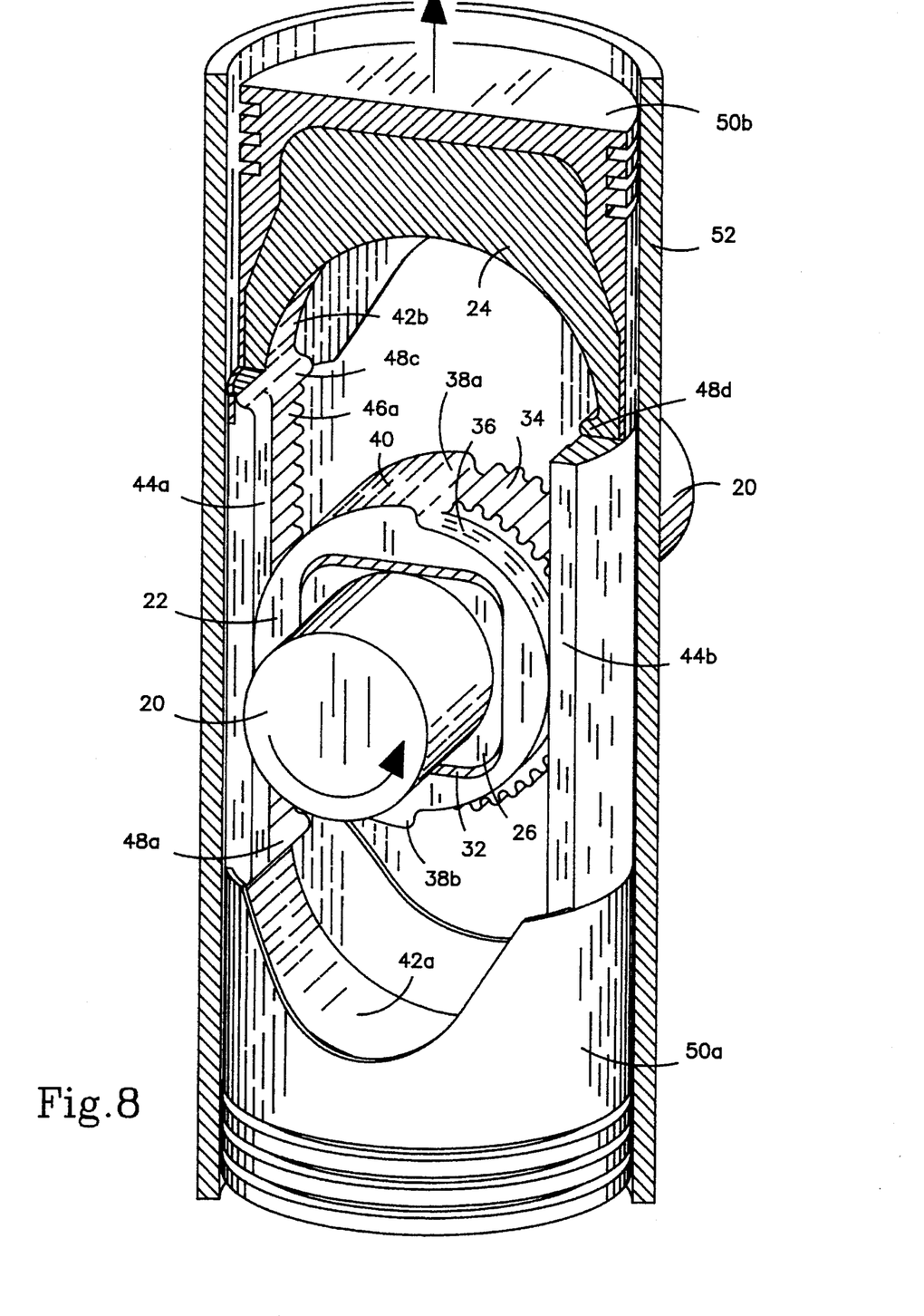
FIG. 8 shows, a perspective sectional plan view of an embodiment of the present invention in a cylinder having a pair of pistons attached on both ends of the elongated element.

As shown in FIG. 8, a pair of pistons, coaxially aligned and attached to both ends of said elongated element, are to generate, convey or convert a power-stroke, compression, expansion, exhaustion, suction or alike actions, in a cylinder, according to the principals of the present invention.

Figure 9:
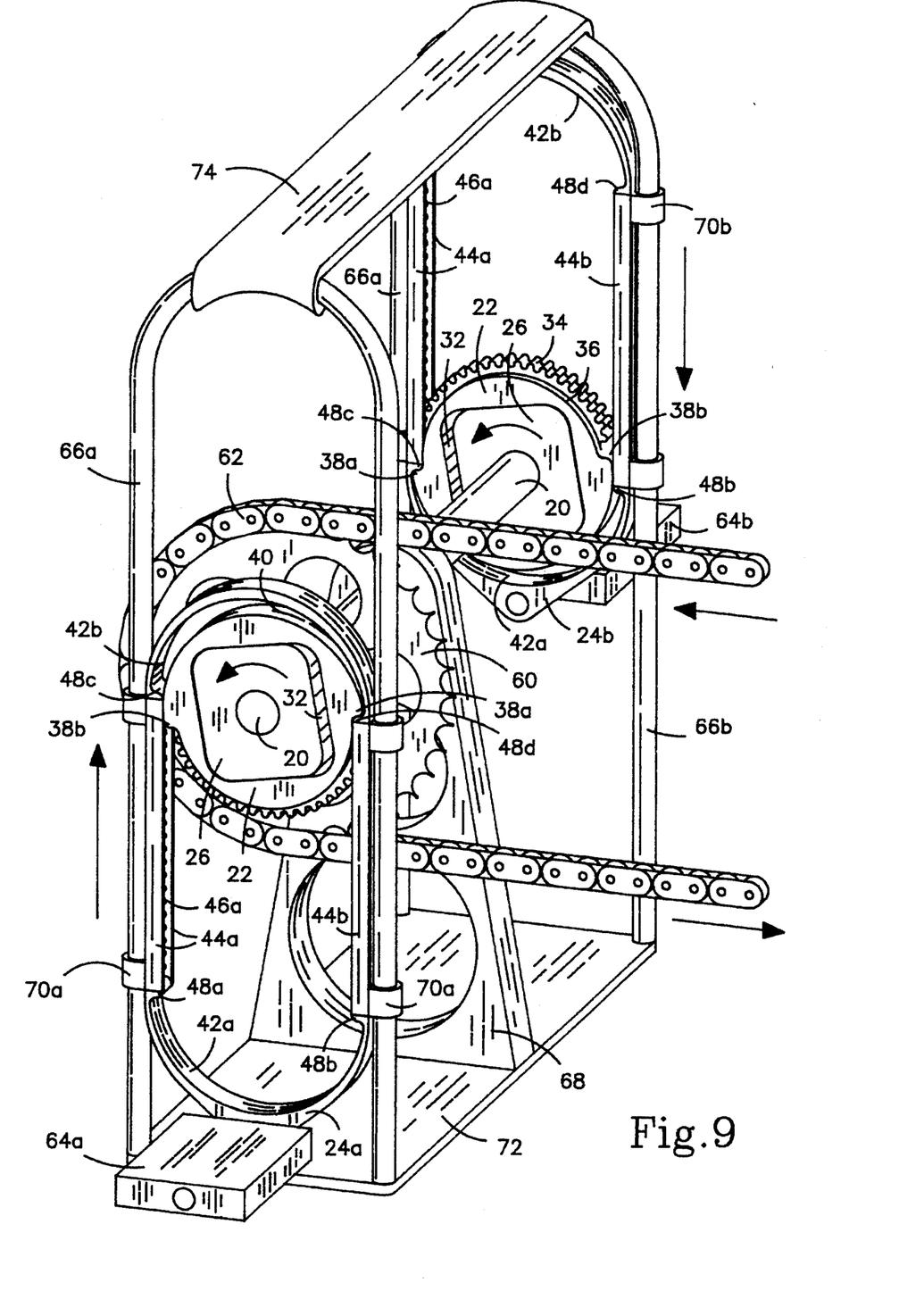
FIG. 9 shows, a pedal operated unit according to the principals of the present invention.

FIG. 9 illustrates another embodiment of the present invention, wherein a reciprocating motion of a cycle-operating unit, generated by a pair of pedals 64a and 64b, in a controlled environment consisting of, slide bearings 70a and 70b, and slide bushes 66a and 66b, is converted to a rotary motion of a chain wheel 60 and a roller chain 62.

Figures 10, 11:
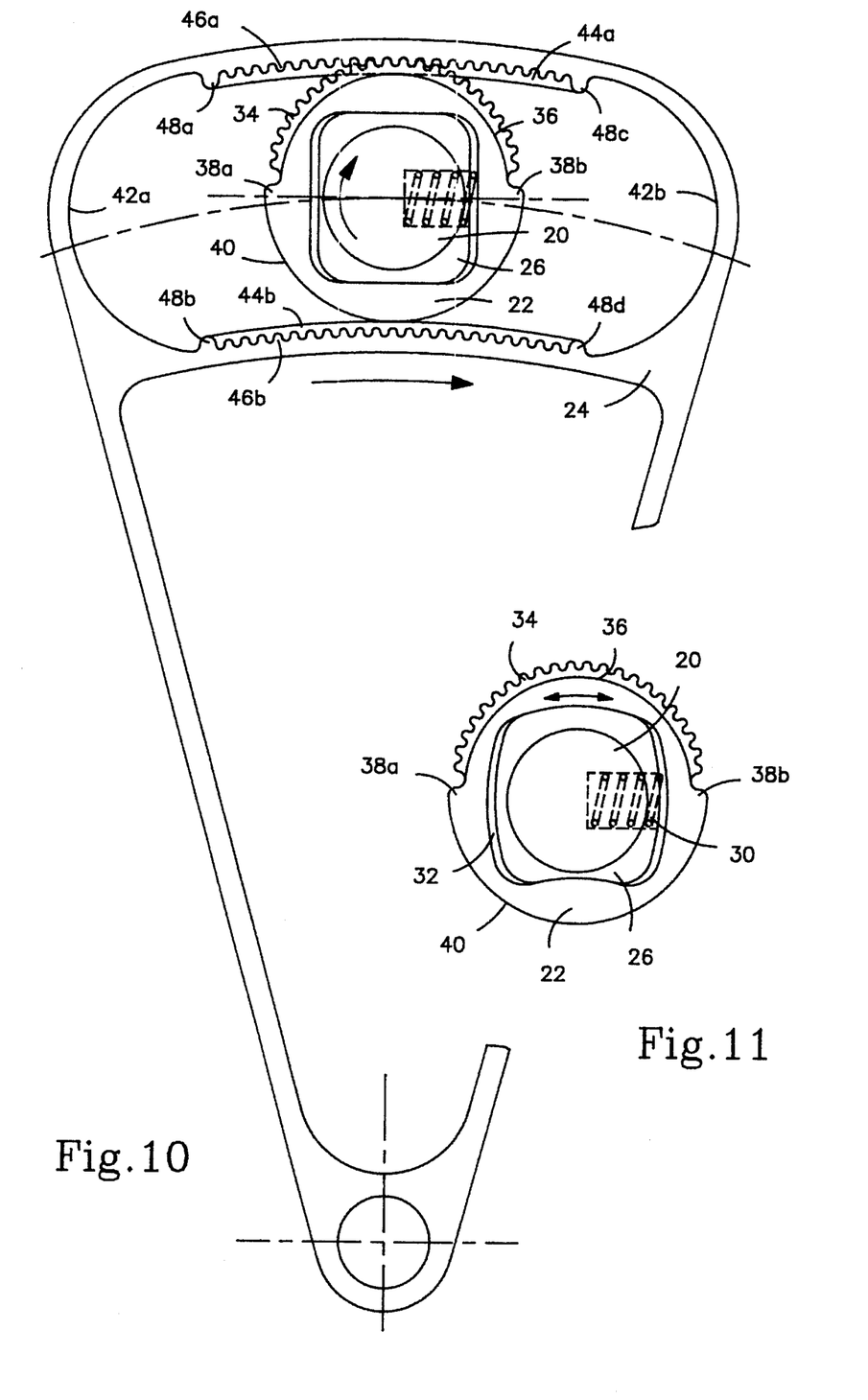
FIG. 10 shows, an embodiment of the present invention having a curved-oriented elongated element, reciprocative on a curved path.
FIG. 11 shows, a curved sliding hole that slides against a curved sliding block on a curved-oriented path.

FIG. 10 shows another embodiment of the present invention, in which the intermediate circular element 22, is engaged with a curve-oriented elongated element 24 reciprocative on a curved path, according to the principals of the present invention.

As shown in FIG. 11, the sliding block 26 and the sliding hole 32, may also be curve-oriented as to suit a conversion of motion within the scope of the present invention.

In conversion of a reciprocating motion to a rotary motion and vise versa, according to the principals of the present invention, near 100% of a reciprocating energy, converted to a rotary energy and near 100% of a rotary energy, converted to a reciprocating energy at one rotation per each reciprocating cycle. Reason for such perfect motion conversion ratios, mainly lies in the angular relationship between the external teeth 34, including the step teeth 38a and 38b, with the elongated internal teeth 46a, and 46b, including the shifting teeth 48a, 48b, 48c and 48d. As shown in FIGS. 5a, 5b, 5c, 5d, and 5e, said angular relationship, constantly maintained at the right angle without interruption.

I claim:

1. An apparatus for conversion of reciprocating motion to rotary motion and rotary motion to reciprocating motion comprising:
   a. a rotating drive shaft comprising a first sliding means;
   b. an intermediate circular element having external teeth extending over near one-half of its circumference and comprising a second sliding means which slidably engages with said drive shaft first sliding means; and
   c. a reciprocating elongated element having a first elongated internal teeth and a second elongated internal teeth opposed to each other and joined by a first internal curve and second internal curve collectively forming a geometry that accommodates said intermediate circular element in a constant engagement for conversion of said drive shaft rotary motion to said elongated element reciprocating motion and conversion of said elongated element reciprocating motion to said drive shaft rotary motion at a motion conversion ratio of one rotation of said drive shaft to one reciprocating cycle of said elongated element.

2. The apparatus of claim 1 wherein the first sliding means is a sliding block formed on the drive shaft and the second sliding means is a sliding hole formed in said intermediate circular element and adopted to receive said sliding block.

3. The apparatus of claim 2 wherein said sliding hole is larger than said sliding block to slidably reciprocate along a lateral axis within said sliding hole.

4. The apparatus of claim 2 wherein said sliding block further comprises a socket housing a spring means to constantly urge said sliding hole toward lateral surfaces of said sliding block.

5. The apparatus of claim 1 wherein the intermediate circular element having external teeth extending over near one-half of its circumference and each end of said external teeth formed by a step tooth whereby together with the other near half of said circumference forming a pivoting tooth.

6. The apparatus of claim 1 wherein the intermediate circular element comprises an arced rim extending over the near one-half of said circumference having external teeth and adjacent to said external teeth.

7. The apparatus of claim 1 wherein the first elongated internal teeth and the second elongated internal teeth having the same number of teeth and said number of teeth are in agreement with the number of the intermediate circular element external teeth and adapted to mesh with said external teeth.

8. The apparatus of claim 1 wherein the first elongated internal teeth and the second elongated internal teeth each at each end being formed by a shifting tooth adopted to engage a step tooth of said intermediate circular element.

9. The apparatus of claim 5 wherein the first internal curve and the second internal curve each joining two shifting tooth of said elongated element and together forming a fulcrum means adopted to engage said intermediate circular element pivoting tooth.

10. The apparatus of claim 1 wherein the reciprocating elongated element comprises a first elongated rim and a second elongated rim each adjacent to the first elongated internal teeth and the second elongated internal teeth respectively.

11. The apparatus of claim 1 wherein the reciprocating elongated element comprises a piston joining said elongated element and reciprocating in a cylinder whereby reciprocating motion of said piston in said cylinder is converted to rotating motion of said drive shaft and rotating motion of said drive shaft is converted to reciprocating motion of said piston.

12. The apparatus of claim 1 wherein said reciprocating elongated element comprises a first piston and a second piston each joining each end of said elongated element and reciprocating in a cylinder whereby reciprocating motion of the first piston and the second piston converted to rotating motion of the drive shaft and the rotating motion of said drive shaft converted to reciprocating motion of said first piston and said second piston.

13. The apparatus of claim 1 wherein the reciprocating elongated element comprises a pedal means that reciprocates with said elongated element whereby reciprocating motion of the pedal is converted to rotating motion of said drive shaft and rotating motion of said drive shaft is converted to reciprocating motion of said pedal.

14. The apparatus of claim 1 wherein the reciprocating elongated element is curved along its longitudinal axis whereby said elongated element reciprocates along a curved path.

15. The apparatus of claim 2 wherein the sliding block and the sliding hole have matching curved peripheries whereby said sliding hole slidably reciprocates along said sliding block lateral axis in a curved path.

* * * * *